US010324827B2

(12) United States Patent
Narayanan et al.

(10) Patent No.: US 10,324,827 B2
(45) Date of Patent: Jun. 18, 2019

(54) METHOD AND SYSTEM FOR AUTOMATICALLY GENERATING TEST DATA FOR TESTING APPLICATIONS

(71) Applicant: Wipro Limited, Bangalore (IN)

(72) Inventors: Gopalan Sathiya Narayanan, Bangalore (IN); Arunav Rath, Bangalore (IN)

(73) Assignee: Wipro Limited, Bangalore (IN)

( * ) Notice: Subject to any disclaimer, the term of this patent is extended or adjusted under 35 U.S.C. 154(b) by 86 days.

(21) Appl. No.: 15/428,790

(22) Filed: Feb. 9, 2017

(65) Prior Publication Data
US 2018/0095866 A1 Apr. 5, 2018

(30) Foreign Application Priority Data
Sep. 30, 2016 (IN) .............................. 201641033617

(51) Int. Cl.
*G06F 11/36* (2006.01)
(52) U.S. Cl.
CPC ...... *G06F 11/3684* (2013.01); *G06F 11/3672* (2013.01); *G06F 11/3688* (2013.01)
(58) Field of Classification Search
CPC .. G06F 11/36; G06F 11/3684; G06F 11/3672; G06F 11/3688
USPC ......................................................... 714/38.1
See application file for complete search history.

(56) References Cited

U.S. PATENT DOCUMENTS

| 7,080,026 | B2 | 7/2006 | Singh et al. | |
| 2004/0078673 | A1* | 4/2004 | Decker | G06F 11/3676 714/33 |
| 2007/0266165 | A1* | 11/2007 | Li | G06F 8/71 709/230 |
| 2008/0282231 | A1* | 11/2008 | R | G06F 11/3684 717/127 |
| 2010/0115328 | A1* | 5/2010 | Betawar | G06F 11/263 714/4.1 |

(Continued)

FOREIGN PATENT DOCUMENTS

| CN | 102831052 A | 12/2012 |
| CN | 104063314 A | 9/2014 |

OTHER PUBLICATIONS

Schieferdecker et al., "Automated Testing of XML.SOAP Based Web Services", 2003, pp. 1-16.

*Primary Examiner* — Kamini B Patel
(74) *Attorney, Agent, or Firm* — LeClairRyan PLLC

(57) ABSTRACT

The present disclosure relates to a method and device for automatically generating test data for testing software applications. In one embodiment, a plurality of test cases associated with test scenarios is determined by analyzing requirements of the software applications. The plurality of test cases is then processed to generate a plurality of test data scripts that are further executed on a first data source to obtain the test data. If it is determined that the execution of the plurality of test cases fail, then the plurality of test data scripts is executed on a second data source to obtain the test data. The first data source is then updated with the test data obtained for future test data requirements. Thus, the technology enables automatic generation of test data obtained from external data sources and thereby improving the testing efficiency and quality of the applications being tested.

15 Claims, 4 Drawing Sheets

(56) References Cited

U.S. PATENT DOCUMENTS

| | | | |
|---|---|---|---|
| 2013/0042145 A1* | 2/2013 | Pasupuleti | G06F 11/3676 |
| | | | 714/32 |
| 2013/0097586 A1* | 4/2013 | Chandra | G06F 11/3684 |
| | | | 717/124 |
| 2013/0104105 A1* | 4/2013 | Brown | G06F 11/3664 |
| | | | 717/124 |
| 2013/0145250 A1* | 6/2013 | Neumueller | G06F 11/3684 |
| | | | 715/234 |
| 2015/0113331 A1* | 4/2015 | Bhattacharya | G06F 11/3688 |
| | | | 714/38.1 |
| 2015/0324274 A1* | 11/2015 | Raghavan | G06F 11/3684 |
| | | | 717/124 |
| 2018/0217921 A1* | 8/2018 | Palyekar | G06F 11/3684 |

* cited by examiner

METHOD AND SYSTEM FOR AUTOMATICALLY GENERATING TEST DATA FOR TESTING APPLICATIONS

This application claims the benefit of Indian Patent Application Serial No. 201641033617 filed Sep. 30, 2016, which is hereby incorporated by reference in its entirety.

FIELD

The present subject matter is related, in general to automated testing of computer applications, and more particularly, but not exclusively to a method and a system for automatically generating test data for testing computer applications.

BACKGROUND

Traditional testing of a computer program can include the external monitoring of integrity and performance of the program, either subjectively based upon end user impression, or objectively based upon independently acquired metrics. Software systems are designed to meet business needs of growing organization. Therefore, software systems are continuously upgraded and developed to meet the growing needs.

Test Automation brings down test cycles resulting in faster and frequent release of software to market. An important aspect of the test automation is test data generation process that is used to generate test data for executing multiple test scenarios in one or more test environments. For testing a given software application, a wide variety of test scenarios may need to be executed, so generation of voluminous test data satisfying the required testing criteria can be a challenging task. Moreover, the quality of any software test is determined based on the test data used for execution. Manual approaches for test data generation have proved to be effective. However, manual software testing is cumbersome and a labor intensive process and needs to be automated for reduction of cost and accuracy in testing. Several approaches for automated test data generation using subset of data, path analysis, and random test data generation have been proposed. Such approaches use data from a single data store, such as a database, to generate test data for testing of the software application. However, these methods are ineffective due to limitations in sourcing test data. Therefore, there is a need for a method and a system that automatically generates vast test data for testing computer applications.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of automatically generating test data for testing applications. The method comprising the step of determining a plurality of test cases based on a plurality of test scenarios, wherein the plurality of test scenarios is created by analyzing requirements of one or more testing applications. The method further comprises the step of generating a plurality of test data scripts associated with the plurality of test cases and executing the plurality of test data scripts thus generated. Based on successful execution of the plurality of test data scripts on a first test data source, a plurality of test data associated with the plurality of test cases is generated. If the execution of the plurality of test data scripts on the first test data source is determined to fail, then the plurality of test data scripts is executed on a second test data source to obtain the plurality of test data from the second test data source. Upon execution, the method updates the first data source with the plurality of test data obtained from the second test data source.

Further, the present disclosure relates to a system for automatically generating test data for testing applications. The system comprises at least a processor and a first data source coupled with the processor and configured to store a plurality of test data, databases and schemas. The system further comprises a memory communicatively coupled with the processor, wherein the memory stores processor-executable instructions, which, on execution, cause the processor to determine a plurality of test cases based on a plurality of test scenarios, wherein the plurality of test scenarios is created by analyzing requirements of one or more testing applications. The processor is configured to generate a plurality of test data scripts associated with the plurality of test cases and execute the plurality of test data scripts on the first test data source to obtain a plurality of test data based on successful execution. If the processor determines that the execution of the plurality of test data scripts on the first test data source failed, then the processor executes dynamically the plurality of test data scripts on a second test data source to obtain the plurality of test data from the second test data source. Upon successful execution, the processor updates the first test data source with the plurality of test data obtained from the second test data source.

Furthermore, the present disclosure relates to a non-transitory computer readable medium including instructions stored thereon that when processed by at least one processor cause a system to perform the act of determining a plurality of test cases based on a plurality of test scenarios, wherein the plurality of test scenarios is created by analyzing requirements of one or more testing applications. Further, the instructions cause the processor to generate a plurality of test data scripts associated with the plurality of test data scripts associated with the plurality of test cases and execute the plurality of test data scripts on the first test data source to obtain a plurality of test data based on successful execution. If the processor determines that the execution of the plurality of test data scripts on the first test data source failed, then the processor executes dynamically the plurality of test data scripts on a second test data source to obtain the plurality of test data from the second test data source. Upon successful execution, the processor updates the first test data source with the plurality of test data obtained from the second test data source.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
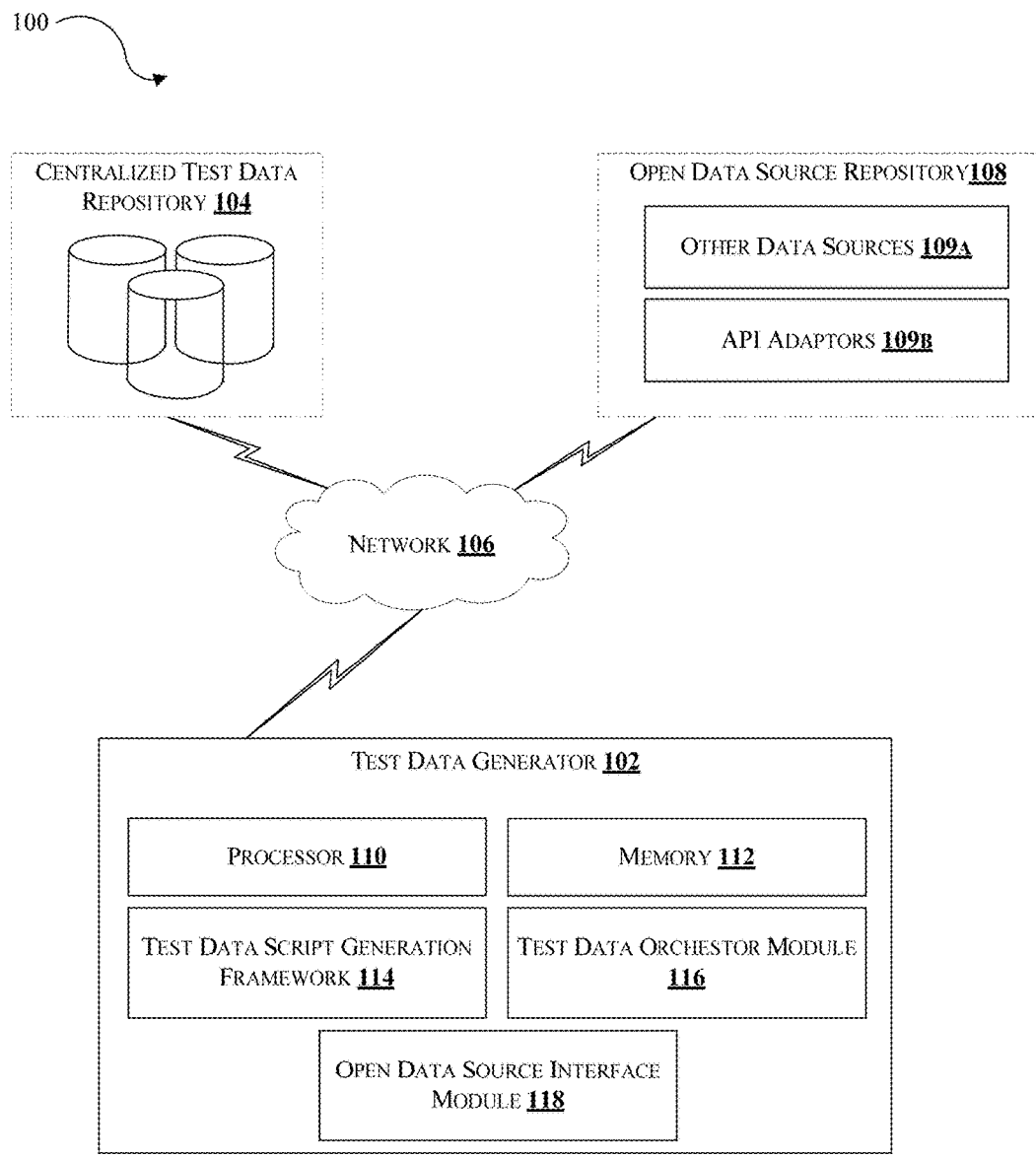
FIG. 1 illustrates an architecture diagram of an exemplary system for automatically generating test data in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for automatically generating test data for testing software applications. In one embodiment, the method determines a plurality of test cases associated with test scenarios, wherein the test scenarios are created by analyzing requirements of the software applications. The plurality of test cases is then processed to generate a plurality of test data scripts associated with the plurality of test cases. Upon generation, the plurality of test data scripts is executed on a first data source to obtain the test data. If it is determined that the execution of the plurality of test cases fail, then the plurality of test data scripts is executed on a second data source to obtain the test data. The first data source is then updated with the test data obtained for future test data requirements. Thus, the system enables automatic generation of test data from a wide coverage of test data obtained from multiple external systems, thereby improving the testing efficiency and quality of the applications being tested.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an architecture diagram of an exemplary system for automatically generating test data for testing applications in accordance with some embodiments of the present disclosure.

As shown in FIG. 1, the exemplary system 100 comprises one or more components configured for enabling automatic generation of test data for testing application. The application may be a software application used to implement process of a business or organization. A software application can run on one or more computing devices (e.g., desktop computers, notebook computers, server computers, portable computing device, and the like). A software application can be accessed locally (e.g. a software application running on a local server) or remotely (e.g., using a web browser to access a software application running on a remote server over the Internet).

A software testing framework for testing the software application may be automated (e.g., via a computing device). The software testing framework can be used to test independent scenarios of a software application automatically without user intervention. Independent scenarios can be tested independently. For example, a user can test an independent scenario of a software application using independent test script. Multiple independent test scenarios can also be tested together, for example, sequentially to form an end-to-end scenario. In one embodiment, the test scenarios are created based on analysis of requirements of the software application. The test scenarios thus created are converted into one or more test cases and test scripts. The software testing framework comprises an exemplary system for generating test data using test data scripts, business rule repositories and test data sources. The test data may be stored in various locations such as test data source. For example, test data can be stored in a database or file, for example a spreadsheet. Test data can comprise various types of data, for example numbers, strings, letters, text, dates, flag and so on.

In one embodiment, the exemplary system 100 comprises a test data generator device (hereinafter referred to as TDG) 102, a centralized test data repository (hereinafter referred to as centralized repository or first test data source) 104 connected via a communication network 106. In one aspect, the centralized repository 104 comprises test data obtained from manufactured and/or mined process of production data. The production data may be actual data obtained from actual production sites where the software is already deployed or required to be deployed. In another aspect, the centralized repository 104 may include data that could be a subset of a production data, masked or full representation of the production data. In addition, the centralized repository 104 also include one of more of end-to-end test scenarios, independent test data scripts, test cases, results of execution of test cases and other related information associated with each test data stored in the past. In yet another aspect, the centralized repository 104 also stores one or more data models with test data mappings with test cases, and test scenarios for a particular testing application.

The system 100 further comprises an open data source repository (hereinafter referred to as other data repository or other data sources or second test data source) 108 coupled with the TDG 102 via the communication network 106. In one implementation, the other data source repository 108 comprises other data sources 109A, and one or more Application Programming Interface (API) adaptors 109B coupled with the other data sources 109A. In one embodiment, the one or more API adaptors 109B are capable of enabling the TDG 102 to access the other data sources 109A if the required test data is not available in the centralized repository 104. The other data sources 109A may be for example include virtual databases, messages in the form of Email, Short Messaging Services (SMS), external Structured Query Language (SQL) based relational databases, web services and other relational and non-relational databases. The system enables the TDG 102 to generate test data from one or more data sources including the centralized repository 104 and the other data source repository 108 for testing applications with wider coverage.

In one embodiment, the TDG 102 comprises at least a processor 110 and a memory 112 coupled with the processor 110. The TDG 102 further comprises a test data script generation framework or module (hereinafter referred to as TDS generation module) 114, a test data orchestor module (interchangeably referred to as orchestor module) 110 and an open data source interface module (hereinafter referred to as "ODS interface module") 122 coupled with the processor 110.

Figure 2:
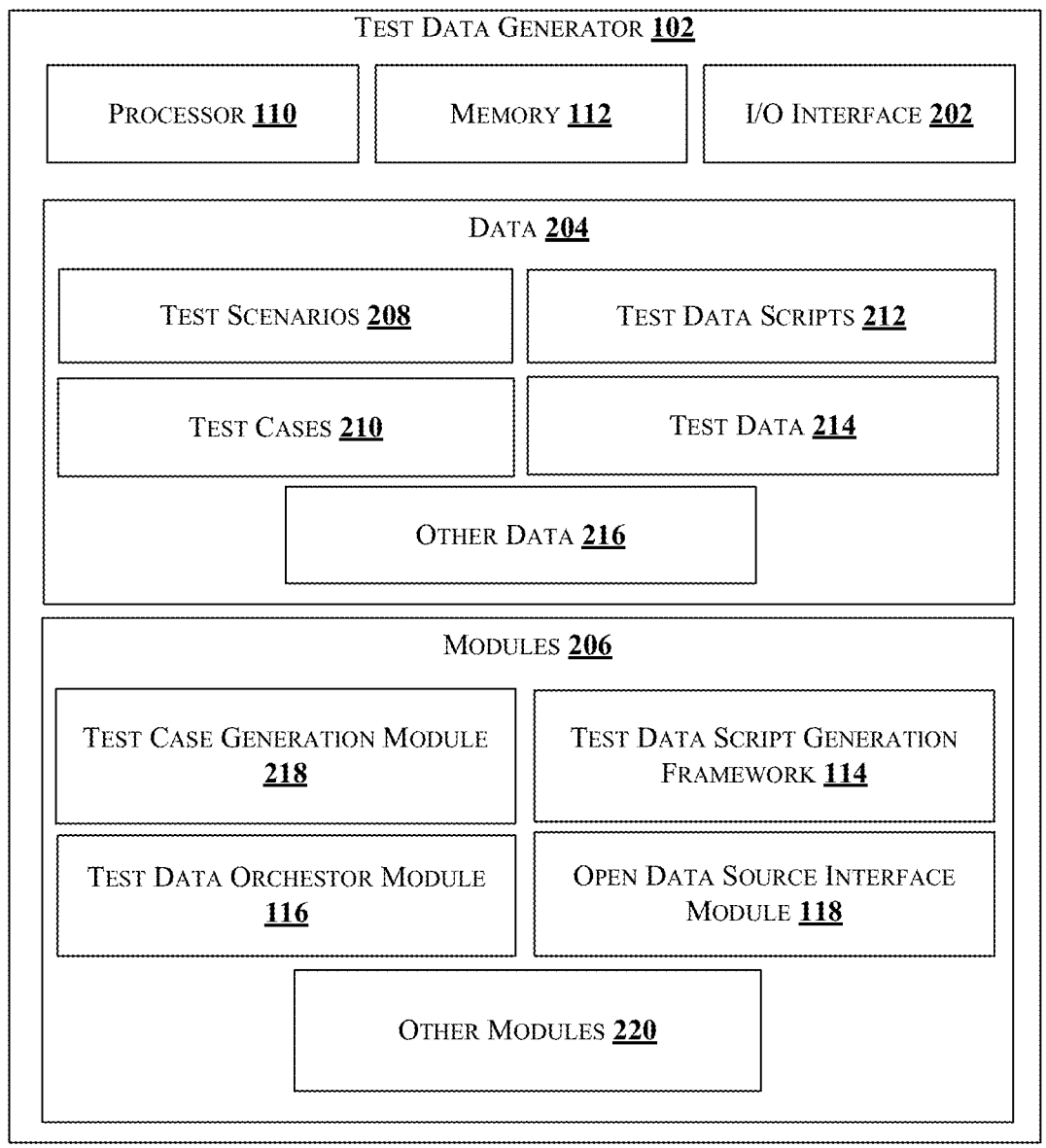
FIG. 2 illustrates an exemplary block diagram of a test data generator of FIG. 1 in accordance with some embodiments of the present disclosure.

The TDG 102 may be a typical TDG as illustrated in FIG. 2. The TDG 102 comprises the processor 110, the memory 112, and an I/O interface 202. The I/O interface 202 is coupled with the processor 110 and an I/O device. The I/O device is configured to receive inputs via the I/O interface 202 and transmit outputs for displaying in the I/O device via the I/O interface 202. The TDG 102 further comprises data 204 and modules 206. In one implementation, the data 204 and the modules 206 may be stored within the memory 112. In one example, the data 204 may include a plurality of test scenarios 208, a plurality of test cases 210, a plurality of test data scripts 212, a plurality of test data 214 and other data 216. In one embodiment, the data 204 may be stored in the memory 112 in the form of various data structures. Additionally, the aforementioned data can be organized using data models, such as relational or hierarchical data models. The other data 216 may be also referred to as reference repository for storing recommended implementation approaches as reference data. The other data 216 may also store data, including temporary data and temporary files, generated by the modules 206 for performing the various functions of the TDG 102.

The modules 206 may include, for example, the TDS generation module 114, the orchestor module 116, the ODS interface module 118 and a test case generation module 218. The modules 206 may also comprise other modules 220 to perform various miscellaneous functionalities of the TDG 102. It will be appreciated that such aforementioned modules may be represented as a single module or a combination of different modules. The modules 206 may be implemented in the form of software, hardware and/or firmware.

In operation, the TDG 102 automatically generates test data for testing software applications. In an embodiment, the software application comprises one or more modules, each module may be related to a group of steps of a number of related business processes of the software application. A business process can represent a typical sequence of steps performed when using the software application. The requirements of the software application include the business processes; each business process may comprise plurality of exemplary scenarios related to the business process. In one embodiment, the scenarios are tested to determine efficient execution of the business process and in turn the software application. For example, a test scenario for an e-commerce application to register a user can include the ordered combination of application specific user login function, an application specific user registration function and an application specific verification function. In addition, the test scenario may also include specific user credentials and user details for use when a user is registered through the user registration scenario. In another example, a test scenario for an e-commerce application to place order for a product can include the ordered combination of application specific user login function, an application specific search function, add to bag function, checkout function, shipping and billing function, payment function, place order function and verification function. In addition, the test scenario may also include specific user credentials, specific product details, specific user details like address, payment details and so on.

In one aspect, the scenarios to be tested are the test scenarios that may be created manually by a testing team. In another aspect, the test case generation module 218 analyses the requirements of the software application, segregates the modules of the business processes of the software application and generates a plurality of test scenarios 208 associated with each of the business processes. Upon generation of the plurality of test scenarios 208, the test case generation module 218 generates the plurality of test cases 210 associated with the plurality of test scenarios 208. In one embodiment, the test case generation module 218 generates the plurality of test cases 210 using known test case generation techniques. The test case generation module 218 also updates the memory 112 and/or the centralized repository 104 with the plurality of test scenarios 208, and the plurality of test cases 210 thus generated. The plurality of test cases 210 are then converted into the plurality of test data scripts 212 corresponding to the plurality of test cases 210.

In one embodiment, the TDS generation module 114 receives the plurality of test cases 210 in an input file having a current file format. The file format, may be for example spreadsheet and data file. A test case may comprise a PRECONDITION, DESCRIPTION and expected results of the test case upon execution. For an example, consider a test scenario of logging into Gmail® account may comprises one or more test cases. Example test case 1 may comprise a PRECONDITION of "Enter the URL and press enter", DESCRIPTION outlook home page and expected result would be "Wipro home page opens up". Example test case 2 may comprise a PRECONDITION of "Internet Explorer® is launched and ready to be used", DESCRIPTION "Enter the username in username section" and expected result would be "Username: XXX, Username is entered and nothing happens". Example test case 3 may comprise a PRECONDITION of "Password values to be entered", DESCRIPTION "Enter the password in password section" and expected result would be "Password: ******** Password is entered and nothing happens". Example test case 4 may comprise a PRECONDITION of "Click Sign in button displayed", DESCRIPTION "Click Sign in" and expected result would be "User logged in".

The TDS generation module 114 converts the plurality of test cases 210 into a corresponding plurality of test cases having a predetermined standard file format. The standard file format, may be for example spreadsheet Excel or CSV format. In one implementation, the plurality of test cases may be received as input from the testing team in a current format that can be downloaded using an Application Programming Interface (API) tool. The TDS generation module 114 converts the plurality of test cases into the standard format based on which the plurality of test data scripts 212 may be generated. Upon conversion, the TDS generation module 114 segregates the converted plurality of test cases into one or more categories such as text, data etc. For the above illustrated test case example, the text category may include all stated in PRE-CONDITION, and DESCRIPTION; and the data category may include Username and Password. Based on the segregation, the TDS generation module 114 collects the segregated data for mapping with one or more data requirements.

In one embodiment, the TDS generation module 114 maps the segregated data with the one or more data requirements such as existing tables and schema structures of one or more relevant databases stored in the centralized repository 104. For example, the Username may be mapped with sys.dba_user and the Password may be mapped with sys.dba_password. Upon mapping, the mapped data requirements are processed to generate the plurality of test data scripts 212 associated with the mapped data requirements. For example, the above mapped Username and Password are converted into corresponding plurality of test data scripts 212 such as SQL statements which may be as illustrated below:

STEP 1: Store the entered username into v_username variable;

STEP 2: Store the entered password into v_password variable;

STEP 3: Create the SQL statement as "SELECT username, password from sys.dba_user, sys.dba_password where sys.dba_user.username=sys.dba_user_password"

The TDS generation module 114 generates the plurality of test data scripts 212 illustrated above as SQL statements. The plurality of test data scripts 212 are then executed to obtain the plurality of test data 214 associated with the plurality of test cases 210.

In one embodiment, the orchestor module 116 receives the plurality of test data scripts 212 of corresponding plurality of test cases 210 and executes the received plurality of test data scripts 212 on data sources to obtain the plurality of test data 214. In one implementation, the orchestor module 116 executes the plurality of test data scripts 212 on the tables or databases stored in the centralized repository 104 to obtain the plurality of test data 214. In the above example, the orchestor module 116 executes the above illustrated SQL statements to obtain the plurality of test data i.e. the username and password meeting the condition as stated above in the SQL statement. If the orchestor module 116 determines that the execution of the plurality of test data scripts 212 fail, then the orchestor module 116 dynamically executes the plurality of test data scripts 212 on the tables or databases stored in the other data source repository 104 to obtain the plurality of test data 214.

The orchestor module 116 access the other data source repository 108 via the ODS interface module 118. In one implementation, the ODS interface module 118 access the tables and databases of the other data sources 109A via the one or more API adaptors 109B generated for interfacing with the other data sources 109A. In one embodiment, the ODS interface module 118 modifies the existing one or more API adaptors 109B based on the test data requirements. For example, the ODS interface module 118 configures an entity framework, and ADO.Net data providers, Language Integrated Query (LINQ) API adaptors to obtain the plurality of test data 214 from the other data sources 109A.

The entity framework is a framework for object relational mapper (ORM) that enables .NET developers to work with relational data using domain specific object. ORM is a programming technique for converting data between incompatible type systems and creates a virtual database for use from within the programming language. The entity framework is built on the existing ADO.NET provider model and is used with entity data model (EDM) to leverage the ADO.NET data services. EDM is a common data model that describes the structure of the data in term of its entities and relationship regardless of its stored form. ADO.NET data provider is used to interact with a data source. The data source can be a simple data store like text files or a complex database like oracle database, MySQL etc. ADO.NET providers are enabled in order to augment the capabilities of a data store as different data store technologies can have different capabilities. Entity framework supports queries in LINQ (Language integrated query) to query different data sources. Developers across the world have always encountered problems in querying data because of the lack of a defined path and need to master a multiple of technologies like SQL, Web Services, etc. On the other hand, LINQ allows writing queries even without the knowledge of query languages like SQL, XML etc. Query expression is a LINQ query, expressed in a form similar to that of SQL with query operators like Select, Where and OrderBy.

The ODS interface module 118 converts the plurality of test data scripts 212 into a query capable of obtaining the plurality of test data 214 from each of the other data sources 109A. The one or more API adaptors 109B execute the query on each of the relational and non-relational type of databases and tables of the other data sources 109A to obtain the plurality of test data 214.

Let us consider a sample application to obtain current balance of a customer was created with the following approach. The ODS interface module 118 generates the one or more API adaptors 109A, for example Hyper Text Markup Language (HTML) and Cascading Style Sheet (CSS) pages to implement a single point of interface. The ODS interface 118 uses a JavaServer Pages Standard Tag Library (JSTL) technology to perform the logic that directly queries two database tables such as Customer and Balance; and inserts the retrieved data into a requested page for example, input.jsp. The two database tables, Customer & Balance details are part of SQL Server database which will be connected using Java Database Connectivity (JDBC) or Open Database Connectivity (ODBC) drivers. The welcome page i.e. input.jsp will have a simple user interface developed using HTML form. Whenever the browser requests this page, the code triggers the data using JDBC driver and retrieve the plurality of test data 214 from the target database tables. Upon obtaining the plurality of test data 214, the orchestor module 114 updates the centralized repository 104 with the plurality of test data 214 obtained from the other data sources 109A for future requirements.

Thus, the system enables automatic generation of test data from a wide coverage of test data obtained from multiple external systems, thereby improving the testing efficiency and quality of the applications being tested. The system also reduces the time involved in software testing, testers time involved in writing test data scripts to validate the data, time required to develop techniques to access other data sources, test data related effects, test data volume for complete test data coverage, test data availability, dependencies with database administrators on data provisioning, testing cycles and production environment dependency.

Figure 3:
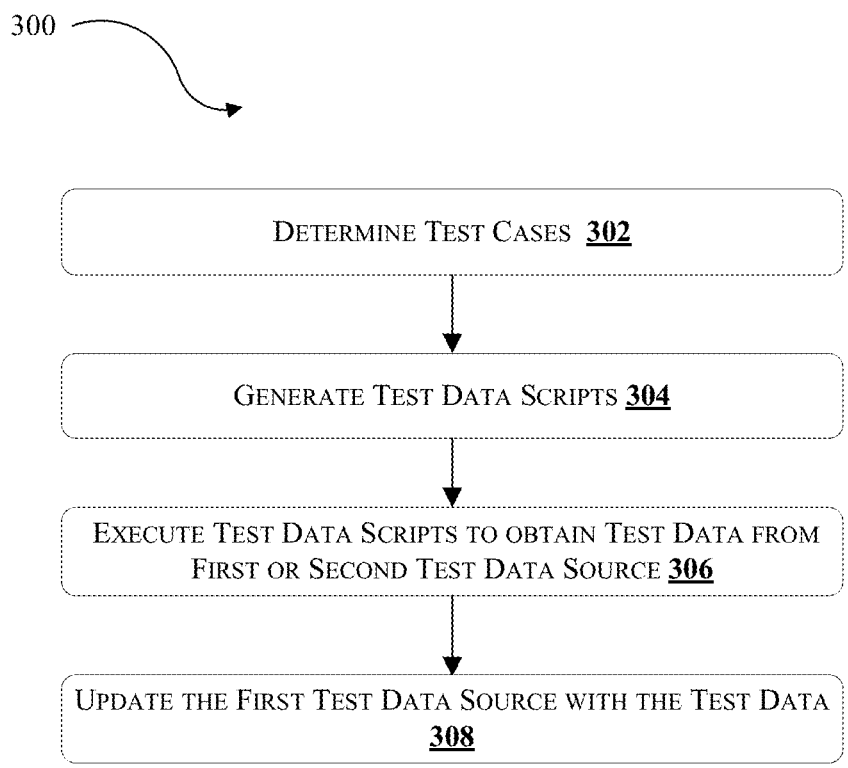
FIG. 3 illustrates a flowchart of an exemplary method of automatically generating test data in accordance with some embodiments of the present disclosure.

FIG. 3 illustrates a flowchart of a method of automatically generating test data for testing applications in accordance with some embodiments of the present disclosure.

As illustrated in FIG. 3, the method 300 comprises one or more blocks implemented by the processor 112 for automatic generation of test data. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, determine test cases. In one embodiment, the test case generation module 218 analyses the requirements of the software application, segregates the modules of the business processes of the software application and generates a plurality of test scenarios 208 associated with each of the business processes. Upon generation of the plurality of test scenarios 208, the test case generation module 218 generates the plurality of test cases 210 associated with the plurality of test scenarios 208. The test case generation module 218 also updates the memory 112 and/or the centralized repository 104 with the plurality of test scenarios 208, and the plurality of test cases 210 thus generated. The plurality of test cases 210 are then converted into the plurality of test data scripts 212 corresponding to the plurality of test cases 210.

At block 304, generate test data scripts. In one embodiment, the TDS generation module 114 receives the plurality of test cases 210 in an input file having a current file format. The file format, may be for example spreadsheet, data file etc. The TDS generation module 114 converts the plurality of test cases 210 into a corresponding plurality of test cases having a predetermined standard file format. The standard file format, may be for example spreadsheet Excel or CSV format. In one implementation, the plurality of test cases may be received as input from the testing team in a current format that can be downloaded using an Application Programming Interface (API) tool. The TDS generation module 114 converts the plurality of test cases into the standard format based on which the plurality of test data scripts 212 may be generated. Upon conversion, the TDS generation module 114 segregates the converted plurality of test cases into one or more categories such as text, data etc. Based on the segregation, the TDS generation module 114 collects the segregated data for mapping with one or more data requirements.

In one embodiment, the TDS generation module 114 maps the segregated data with the one or more data requirements such as existing tables and schema structures of one or more relevant databases stored in the centralized repository 104. Upon mapping, the mapped data requirements are processed to generate the plurality of test data scripts 212 associated with the mapped data requirements. The TDS generation module 114 generates the plurality of test data scripts 212 illustrated above as SQL statements. The plurality of test data scripts 212 are then executed to obtain the plurality of test data 214 associated with the plurality of test cases 210.

At block 306, execute test data scripts to obtain test data from first test data source or second test data source. In one embodiment, the orchestor module 116 receives the plurality of test data scripts 212 of corresponding plurality of test cases 210 and executes the received plurality of test data scripts 212 on data sources to obtain the plurality of test data 214. In one implementation, the orchestor module 116 executes the plurality of test data scripts 212 on the tables or databases stored in the centralized repository 104 to obtain the plurality of test data 214. If the orchestor module 116 determines that the execution of the plurality of test data scripts 212 fail, then the orchestor module 116 dynamically executes the plurality of test data scripts 212 on the tables or databases stored in the other data source repository 104 to obtain the plurality of test data 214.

The orchestor module 116 access the other data source repository 108 via the ODS interface module 118. In one implementation, the ODS interface module 118 access the tables and databases of the other data sources 109A via the one or more API adaptors 109B generated for interfacing with the other data sources 109A. In one embodiment, the ODS interface module 118 modifies the existing one or more API adaptors 109B based on the test data requirements. The ODS interface module 118 converts the plurality of test data scripts 212 into a query capable of obtaining the plurality of test data 214 from each of the other data sources 109A. The one or more API adaptors 109B execute the query on each of the relational and non-relational type of databases and tables of the other data sources 109A to obtain the plurality of test data 214.

At block 308, update first test data source with the test data. Upon obtaining the plurality of test data 214, the orchestor module 114 updates the centralized repository 104 with the plurality of test data 214 obtained from the other data sources 109A for future requirements.

Thus, the system enables automatic generation of test data from a wide coverage of test data obtained from multiple external systems, thereby improving the testing efficiency and quality of the applications being tested. The system also reduces the time involved in software testing, testers time involved in writing test data scripts to validate the data, time required to develop techniques to access other data sources, test data related effects, test data volume for complete test data coverage, test data availability, dependencies with database administrators on data provisioning, testing cycles and production environment dependency.

Figure 4:
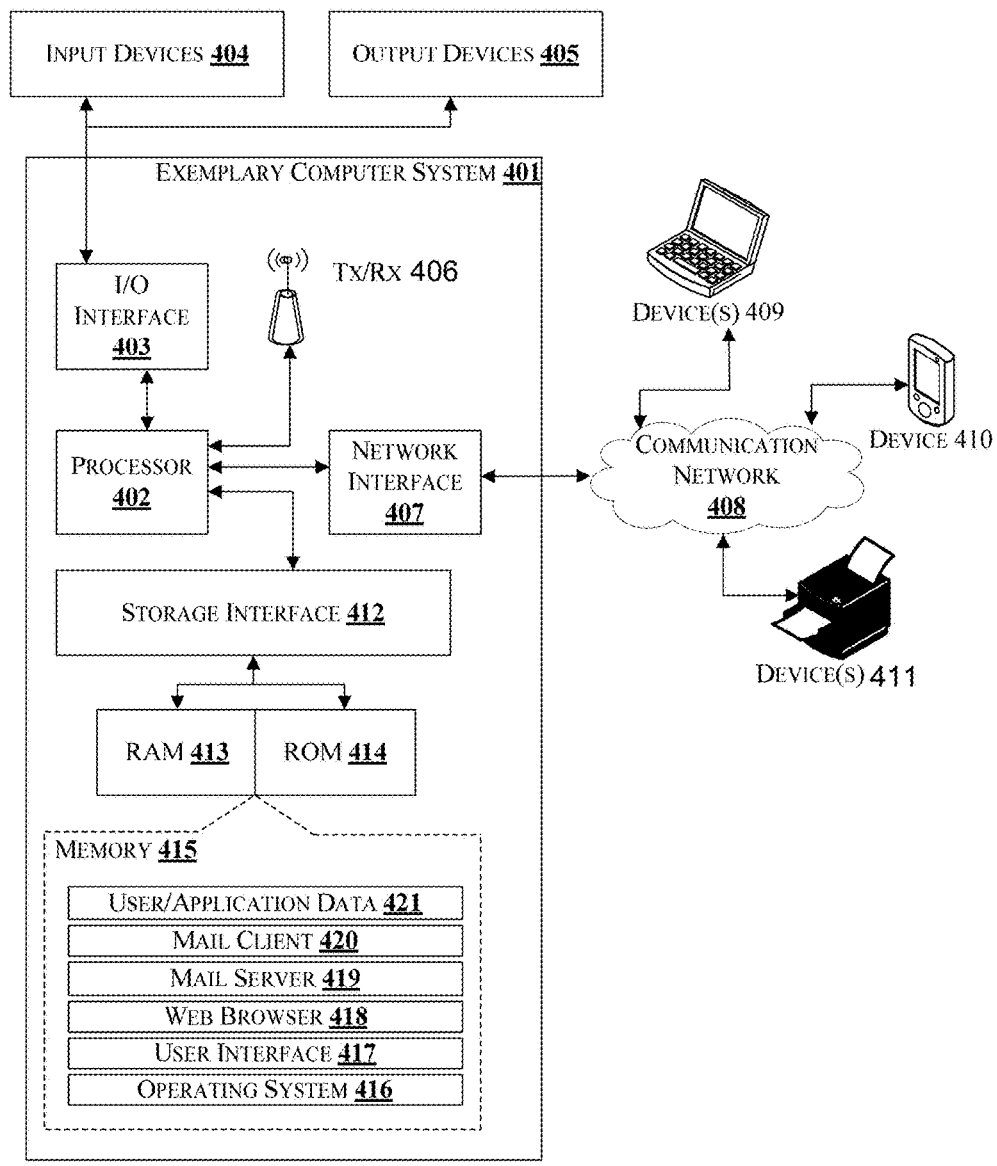
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. Processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 206, amongst other things, include routines, programs, objects, components, and data structures, which perform particular tasks or implement particular abstract data types. The modules 206 may also be implemented as, signal processor(s), state machine(s), logic circuitries, and/or any other device or component that manipulate signals based on operational instructions. Further, the modules 208 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of automatically generating test data for testing applications, said method comprising:
   determining, by a test data generator device, a plurality of test cases based on a plurality of test scenarios, wherein the plurality of test scenarios is created by analyzing requirements of one or more testing applications;
   generating, by a test data script generation framework of the test data generator, a plurality of test data scripts associated with the plurality of test cases;
   executing, by the test data generator device, the plurality of test data scripts on a first test data source to obtain a plurality of test data, associated with the plurality of test cases, from the first test data source based on successful execution;
   executing dynamically, by the test data generator device, the plurality of test data scripts on a second test data source to obtain the plurality of test data from the second test data source, if the execution of the plurality of test data scripts on the first test data source is determined to fail, wherein the plurality of test data is obtained from the second data source using an Open Data Source framework, and wherein the second test data source comprises one or more other test data sources and each of the one or more other test data sources is either a relational or a non-relational type test data source; and
   updating, by the test data generator device, the first data source with the plurality of test data obtained from the second test data source.

2. The method as claimed in claim 1, wherein the generating the plurality of test data scripts further comprises:
   receiving the plurality of test cases in an input file having a current file format;
   converting the plurality of test cases into a corresponding plurality of test cases having a predetermined standard file format, having text and data segregated from the converted plurality of test cases;
   mapping the segregated data with one or more data requirements; and
   generating the plurality of test data scripts associated with the mapped data requirements.

3. The method as claimed in claim 1, wherein the open data source framework comprises at least:
   one or more individual Application Program Interface (API) adaptors for executing the plurality of test data scripts from each of the one or more other test data sources; and
   a virtual database for temporarily storing the plurality of test data obtained based on execution of the plurality of test data scripts.

4. The method as claimed in claim 1, wherein the executing the plurality of test data scripts on the second test data source, further comprises:
   accessing, using an Open Data Source framework of the test data generator, the second test data source that comprises a one or more other test data sources, wherein each of the one or more of other test data sources is either a relational or a non-relational type test data source;
   generating one or more individual Application Program Interface (API) adaptors for interfacing with each of the one or more other test data sources;
   converting the plurality of test data scripts into a query capable of obtaining the plurality of test data from each of the one or more other test data sources using the one or more individual API adaptors executing the query on each of the relational and non-relational type test data source of the one or more other test data sources to obtain the plurality of test data; and updating the first test data source with a plurality of test data obtained from execution of the query on each of the one or more other test data sources upon execution of the query.

5. The method as claimed in claim 1, wherein the first test data source is a centralized data repository and the second test data source is an open data repository, wherein the open data repository comprises one or more of one or more web services, a messaging queue, one or more virtual databases, or one or more other related databases.

6. A test data generator device, comprising:

a processor;

a first data source coupled to the processor and configured to store a plurality of test data, databases, and schemas; and a memory communicatively coupled to the processor, wherein the memory stores processor-executable instructions, which, on execution by the processor, cause the processor to:

determine a plurality of test cases based on a plurality of test scenarios, wherein the plurality of test scenarios is created by analyzing requirements of one or more testing applications;

generate a plurality of test data scripts associated with the plurality of test cases;

execute the plurality of test data scripts on the first test data source to obtain a plurality of test data, associated with the plurality of test cases, from the first test data source based on successful execution;

execute dynamically the plurality of test data scripts on a second test data source to obtain the plurality of test data from the second test data source, if the execution of the plurality of test data scripts on the first test data source is determined to fail, wherein the plurality of test data is obtained from the second data source using an Open Data Source framework, and wherein the second test data source comprises one or more other test data sources and each of the one or more other test data sources is either a relational or a non-relational type test data source; and update the first test data source with the plurality of test data obtained from the second test data source.

7. The test data generator device as claimed in claim 6, wherein the processor-executable instructions, when executed by the processor, further cause the processor to:

receive the plurality of test cases in an input file having a current file format;

convert the plurality of test cases into a corresponding plurality of test cases having a predetermined standard file format, having text and data segregated from the converted plurality of test cases;

map the segregated data with one or more data requirements; and generate the plurality of test data scripts associated with the mapped data.

8. The test data generator device as claimed in claim 6, wherein the open data source framework comprises at least:

one or more individual Application Program Interface (API) adaptors for executing the plurality of test data scripts from each of the one or more other test data sources; and a virtual database for temporarily storing the plurality of test data obtained based on execution of the plurality of test data scripts.

9. The test data generator device as claimed in claim 6, wherein the processor is configured to execute the plurality of test data scripts on the second test data source to:

access, using the Open Data Source framework, the second test data source that comprises the one or more other test data sources;

generate the one or more individual API adaptors for interfacing with each of the one or more other test data sources;

convert the plurality of test data scripts into a query capable of obtaining the plurality of test data from each of the one or more other test data sources using the one or more individual API adaptors execute the query on each of the relational and non-relational type test data source of the one or more other test data sources to obtain the plurality of test data; and update the first test data source with a plurality of test data obtained from execution of the query on each of the one or more other test data sources in upon execution of the query.

10. The test data generator device as claimed in claim 6, wherein the first test data source is a centralized data repository and the second test data source is an open data repository, wherein the open data repository comprises one or more of one or more web services, a messaging queue, one or more virtual databases, or one or more other related databases.

11. A non-transitory computer readable medium comprising instructions stored thereon that when executed by at least one processor cause the at least one processor to:

determine a plurality of test cases based on a plurality of test scenarios, wherein the plurality of test scenarios is created by analyzing requirements of one or more testing applications;

generate a plurality of test data scripts associated with the plurality of test cases;

execute the plurality of test data scripts on a first test data source to obtain a plurality of test data, associated with the plurality of test cases, from the first test data source based on successful execution;

execute dynamically the plurality of test data scripts on a second test data source to obtain the plurality of test data from the second test data source, if the execution of the plurality of test data scripts on the first test data source is determined to fail, wherein the plurality of test data is obtained from the second data source using an Open Data Source framework, and wherein the second test data source comprises one or more other test data sources and each of the one or more other test data sources is either a relational or a non-relational type test data source; and update the first data source with the plurality of test data obtained from the second test data source.

12. The medium as claimed in claim 11, wherein the instructions, when executed by the at least one processor, further causes the at least one processor to:

receive the plurality of test cases in an input file having a current file format;

convert the plurality of test cases into a corresponding plurality of test cases having a predetermined standard file format, having text and data segregated from the converted plurality of test cases;

map the segregated data with one or more data requirements; and generate the plurality of test data scripts associated with the mapped data requirements.

13. The medium as claimed in claim 11, wherein the open data source framework comprises at least:
one or more individual Application Program Interface (API) adaptors for executing the plurality of test data scripts from each of the one or more other test data sources; and
a virtual database for temporarily storing the plurality of test data obtained based on execution of the plurality of test data scripts.

14. The medium as claimed in claim 11, wherein the instructions, when executed by the at least one processor, further cause the at least one processor to:
access the second test data source that comprises a one or more other test data sources, wherein each of the one or more of other test data sources is either a relational or a non-relational type test data source;
generate one or more individual Application Program Interface (API) adaptors for interfacing with each of the one or more other test data sources;
convert the plurality of test data scripts into a query capable of obtaining the plurality of test data from each of the one or more other test data sources using the one or more individual API adaptors execute the query on each of the relational and non-relational type test data source of the one or more other test data sources to obtain the plurality of test data; and
update the first test data source with a plurality of test data obtained from execution of the query on each of the one or more other test data sources upon execution of the query.

15. The medium as claimed in claim 11, wherein the first test data source is a centralized data repository and the second test data source is an open data repository, wherein the open data repository comprises one or more of one or more web services, a messaging queue, one or more virtual databases, or one or more other related databases.

\* \* \* \* \*